United States Patent
Tzeng et al.

(10) Patent No.: US 9,369,047 B2
(45) Date of Patent: Jun. 14, 2016

(54) POWER CONTROL METHODS FOR FLYBACK CONVERTERS BASED ON THE CURRENT LIMIT AND SWITCHING FREQUENCY

(71) Applicants: DELTA ELECTRONICS, INC., Kuei San, Taoyuan Hsien (TW); POWER FOREST TECHNOLOGY CORPORATION, Zhubei, Hsinchu County (TW)

(72) Inventors: Ren-Huei Tzeng, Chupei (TW); Kuan-Sheng Wang, Chupei (TW); Wei-Chan Hsu, Chupei (TW); Chien-Chung Chang, Taoyuan Hsien (TW); Geu-Cheng Hu, Taoyuan Hsien (TW); Cheng-Yi Lin, Taoyuan Hsien (TW)

(73) Assignees: DELTA ELECTRONICS INC., Taoyuan Hsien (TW); POWER FOREST TECHNOLOGY CORPORATION, Zhubei, Hsinchu County (TW)

( * ) Notice: Subject to any disclaimer, the term of this patent is extended or adjusted under 35 U.S.C. 154(b) by 0 days.

(21) Appl. No.: 14/078,842

(22) Filed: Nov. 13, 2013

(65) Prior Publication Data

US 2014/0133193 A1 May 15, 2014

Related U.S. Application Data

(60) Provisional application No. 61/725,811, filed on Nov. 13, 2012.

(51) Int. Cl.
*H02M 3/335* (2006.01)

(52) U.S. Cl.
CPC .......... *H02M 3/335* (2013.01); *H02M 3/33507* (2013.01); *H02M 3/33515* (2013.01); *H02M 3/33523* (2013.01); *H02M 3/33538* (2013.01); *H02M 3/33546* (2013.01); *H02M 3/33553* (2013.01)

(58) Field of Classification Search
None
See application file for complete search history.

(56) References Cited

U.S. PATENT DOCUMENTS

| 2009/0195953 | A1* | 8/2009 | Chen et al. ............... 361/87 |
| 2010/0302815 | A1* | 12/2010 | Li et al. ............... 363/21.09 |
| 2011/0051470 | A1 | 3/2011 | Li et al. |
| 2013/0094247 | A1* | 4/2013 | Kleinpenning ......... H02M 3/24 363/16 |

FOREIGN PATENT DOCUMENTS

| JP | 2005-304269 A | 10/2005 |
| JP | 2008-92794 A | 4/2008 |

OTHER PUBLICATIONS

Office Action issued on Dec. 2, 2014 in corresponding Japanese Patent Application No. 2013-234831 (12 pages).

* cited by examiner

*Primary Examiner* — Timothy J Dole
*Assistant Examiner* — Ishrat Jamali
(74) *Attorney, Agent, or Firm* — Muncy, Geissler, Olds & Lowe, P.C.

(57) ABSTRACT

Methods for flyback converters are provided. The method, adopted by a flyback converter circuit including a transformer, including: determining an output voltage output from a secondary circuit of the transformer; feeding a feedback voltage based on the output voltage from the secondary circuit back to a primary circuit of the transformer; increasing a current limit and a switching frequency of a primary current with the feedback voltage; and supplying the primary current to a primary winding of the transformer.

14 Claims, 9 Drawing Sheets

POWER CONTROL METHODS FOR FLYBACK CONVERTERS BASED ON THE CURRENT LIMIT AND SWITCHING FREQUENCY

CROSS REFERENCE TO RELATED APPLICATIONS

This application claims priority of U.S. Provisional Applications No. 61/725,811, filed on Nov. 13, 2012, the entirety of which is incorporated by reference herein.

BACKGROUND OF THE INVENTION

1. Field of the Invention

The present invention relates to power systems, and in particular, to methods for methods for flyback converters.

2. Description of the Related Art

Switching mode power supplies (SMPS) or converters provide superior power conversion efficiency. It is because the switch device (transistor or MOSFET) in its power stage works either in saturation (high current but voltage close to zero) or cut off (high voltage but zero current) region periodically with high frequency, so the loss of the switch device is low, For linear converter, the semiconductor device in power stage always works in active region with high power loss due to its voltage and current are both high during operation. Due to its high efficiency, the switching mode converters have been found to be particularly useful in a variety of portable devices (e.g., mobile phones, digital cameras, tablets, digital music players, media players, portable disk drives, handheld game consoles, and other handheld consumer electronic devices) that are powered by limited internal batteries such as the lithium batteries. Flyback converter usually is implemented to provide voltage regulation.

As technology develops, more features and functions are incorporated into the portable devices, leading to a higher demand on the power delivery from the power converter. In some applications, higher current is required for a short period of time (temporary power boost requirement for a short period of time). Some examples are in printers, motors, or for CPU boost operations. The amount of excess power may be as high as twice that of the maximum power delivered in a normal operation, the conventional converters can't deliver the amount of excess power without adding cost (bigger transformer to avoid saturation). The advantages of those methods mentioned above are:

By increasing switching frequency and transformer primary peak current limitation during surge load condition, it is not necessary to use bulky transformer to avoid core saturation at surge load condition.

The efficiency of the power supply at rated load can be optimized. The switching frequency at rated load is lower than that at surge mode operation, so the switching loss at rated load condition is lower and can get better efficiency.

BRIEF SUMMARY OF THE INVENTION

This invention proposes a method to increase the power delivery capability of a converter for short period to fulfill surge power demand without adding cost, or minimum if it is necessary. It also proposes a method to mitigate issues related to short circuit conditions. A detailed description is given in the following embodiments with reference to the accompanying drawings.

An embodiment of a method is provided, adopted by a flyback converter circuit including a transformer, comprising: determining an output voltage generated from a secondary circuit of the transformer; feeding a feedback voltage based on the output voltage to a primary circuit of the transformer; increasing a current limit and a switching frequency of a primary current according the feedback voltage; and supplying the primary current to a primary winding of the transformer.

Another embodiment of a method is disclosed, adopted by a flyback converter circuit including a transformer, comprising: determining an output voltage generated from a secondary circuit of the transformer; feeding a feedback voltage based on the output voltage to a primary circuit of the transformer; increasing a switching frequency of a primary current according the feedback voltage by a first fixed rate; increasing current limit of the primary current with the determined output voltage by an adaptable rate; and supplying the primary current to a primary winding of the transformer.

Another embodiment of a method is described, adopted by a flyback converter circuit including a transformer, comprising: determining an output voltage generated from a secondary circuit of the transformer; feeding a feedback voltage based on the output voltage to a primary circuit of the transformer; increasing a current limit and a switching frequency of the primary current according the feedback voltage; supplying the primary current to the primary winding of the transformer; and when the feedback voltage exceeds a short-circuit threshold voltage, the primary current limit reduced to a substantially constant overload current; wherein the substantially constant overload current is less than a maximal current limit of the primary current.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

FIGS. 1 through 9 illustrate switching mode power supply (SMPS) embodiments that provide boosted power delivery, increased power controllability, and short circuit protection, meeting growing power demands on today's computing devices, networking devices, communication devices, mobile devices, and other electronic and electrical devices.

Figure 1:
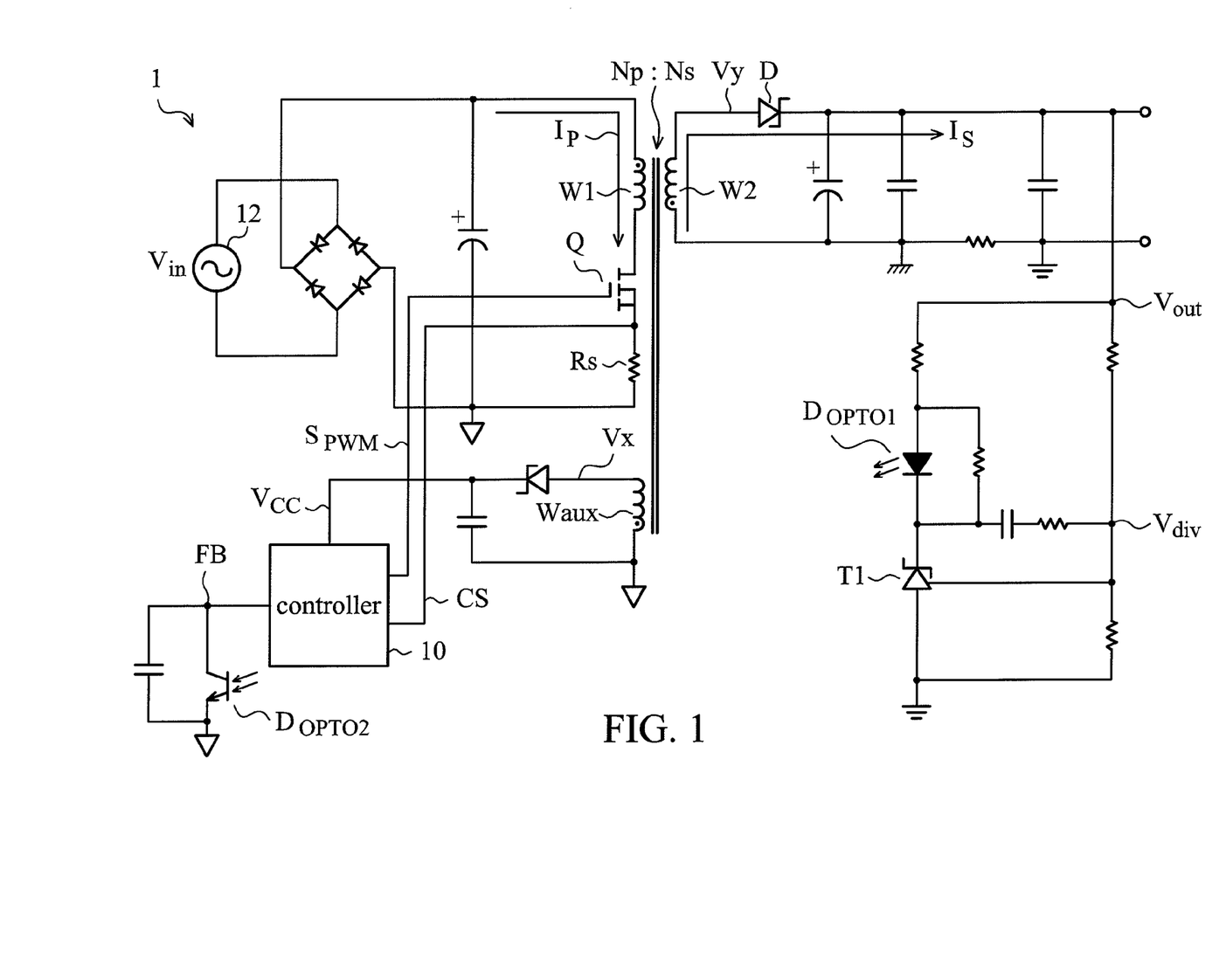
FIG. 1 is a block diagram of a flyback converter 1 according to an embodiment of the invention.

FIG. 1 is a block diagram of a flyback SMPS 1 according to an embodiment of the invention, including a power source 12, a rectifier, a transformer, an output sensing circuit 14, optic couplers $D_{OPTO1}$ and $D_{OPTO2}$, a controller 10, and a switching transistor Q. The flyback SMPS 1 turns the alternated current (AC) power source 12 into direct current (DC) and supplies a regulated power output $V_{out}$ to a connected load (not shown) such as a motor, a central processing unit (CPU) or a microprocessor, which may require a surge of the power delivery temporarily.

The AC input power source from the power source 12 is converted into DC power through the rectifier, the DC power source supplied to transformer is controlled by the switching transistor Q. The switching transistor Q and transformer form the heart of the flyback SMPS 1. The transformer contains a primary winding W1, a secondary winding W2 and an auxiliary winding Waux. The power source 12 is supplied to the switching transistor Q through the primary winding W1 of the transformer. The switching transistor Q acts as a switch. When the switch transistor Q is turned on, driven into saturation and conducts, the switch is closed and provides a path for a primary current $I_P$ (primary current) to flow through the primary winding W1 of the pulse transformer to the power return lead, thus energy is stored in the transformer core through the magnetizing inductance of the primary winding W1. When the switching transistor Q is turned off, in a cutoff region and does not conduct, the switch is opened and the stored energy is delivered into the load through secondary winding W2. Consequently, current does not flow simultaneously in the primary and second windings W1 and W2 of the transformer.

Varying the switching frequency (by Pulse Rate Modulation, referred to as PRM) or duration (by Pulse Width Modulation, referred to as PWM) of the PWM signal $S_{PWM}$ will result in duty cycle variation of the input $I_P$ and a corresponding output regulation of the output voltage $V_{out}$. The output voltage regulation is provided through the optic couplers $D_{OPTO1}$ and $D_{OPTO2}$. In one implementation, the output voltage $V_{out}$ is detected and divided into a voltage $V_{div}$ through a resistor network. The voltage $V_{div}$ is used to control the shunt regulator T1 which generates a current, proportional to difference between the voltage $V_{div}$ and an internal regulated voltage, typically at 2.5V, of the shunt regulator T1. The shunt regulator generated current is converted into a feedback voltage $V_{FB}$ through the optic couplers $D_{OPTO1}$ and $D_{OPTO2}$ which provide isolation between the primary and secondary circuits of the flyback SMPS 1.

The flyback SMPS 1 can operate with a peak current control mode. In the peak current control converter, the feedback voltage $V_{FB}$ is employed to set the current limit $I_{lim}$ of the peak current of the primary current $I_P$ for each duty cycle. The controller 10 can sense the current $I_P$ through the primary winding W1 and the sense voltage Vcs across the sense resistor Rs. The current limit $I_{lim}$ is controlled by the controller 10 according to the sense voltage limit Vcs_lim. More specifically, the controller 10 is configured to connected to the sense resistor Rs to detect the sense voltage Vcs, and configure the current limit $I_{lim}$ for the current $I_P$ according to Equation [1]:

$$I_{lim} = Vcs\_lim/Rs \qquad \text{Equation [1]}$$

The sense voltage Vcs is the voltage across the sense resistor Rs. When the output load draws certain amount of output power, the sense voltage limit Vcs_lim will be increased according to a relationship to the feedback voltage $V_{FB}$ corresponding to the output power, which in turn is used by the controller 10 to control the switching transistor Q to restrict the sense voltage Vcs equaling the sense voltage limit Vcs_lim, thereby imposing the current limit $I_{lim}$ over the primary current $I_P$. More specifically, when the primary winding W1 trying to draw current to make a sense voltage Vcs exceeding the sense voltage limit Vcs_lim, the controller 10 is configured to turn off the switching transistor Q so that the "ON time" of the primary current $I_P$ is decreased, thereby restricting the sense voltage Vcs within the sense voltage limit Vcs_lim. Conversely, when the primary winding W1 draws current to make a sense voltage Vcs equaling or less than the sense voltage limit Vcs_lim, the controller 10 is configured to keep the switching transistor Q turning on so that the "ON time" of the primary current $I_P$ continues, thereby increasing the sense voltage Vcs and delivering the required power to the secondary circuit. As explained herein, the sense voltage limit Vcs_lim is in direct proportion to the current limit $I_{lim}$, an increase in the current limit $I_{lim}$ will follow an increase in the sense voltage limit Vcs_lim, and vice versa. Thus in the following sections, when the behavior of only one of the two terms is described, it would automatically imply behavior of the other term can act similarly.

The flyback SMPS 1 can operate in either continuous current mode (CCM) or discontinuous current mode (DCM). The output power can be derived from the following equation;

$$P_{out} = \frac{1}{2}L(i_{p1}^2 - i_{p2}^2)f_{fmax} = \frac{1}{2}Li_{p1}^2 f_{65\,KHz}\left(2 - \frac{f_{65\,KHz}}{f_{fmax}}\right) \qquad \text{Equation [2]}$$

Where
$f_{fmax}$ is the maximum boosted frequency during surge power duration
$f_{65KHz}$ is the switching frequency at rated load condition, here assume it is 65 KHz
$P_{out}$ is the output power at surge load condition;
$i_{p1}$ and $i_{p2}$ are the two points of primary current of flyback converter, $i_{p1}$ is higher than $i_{p2}$. $I_{p2}$ is zero if flyback converter is in DCM mode.
From Equation [2], it can be seen that the output power $P_{out}$ is merely doubled compared with rated power even if the switching frequency is increased to infinite. Thus, to meet the application with higher peak power, other than to increase the switching frequency, $I_{p1}$ also is necessary to be increased, so that the output power can be booted to more than two times higher than rated requirement.

We can also explain more detailed by the following equation. For higher power operations, it is desirable to operate the converter in CCM mode for better efficiency, the delivered output power at the secondary circuit can be expressed as:

$$P_{out} = \eta N_{ratio}V_{out}(1-D)\left(I_{lim} - \frac{N_{ratio}V_{out}(1-D)}{2L_p F_{sw}}\right) \qquad \text{Equation [3]}$$

where:
$P_{out}$ is the output power;
$\eta$ represents efficiency of the SMPS 1;

$N_{ratio}$ is a turn ratio of the transformer, Np/Ns, wherein Np is turns of primary side, Ns is turns of secondary side;

$V_{out}$ is the output voltage;

D is a switching duty cycle for the transformer primary current $I_P$;

$I_{lim}$ is the current limit for the transformer primary current $I_P$;

$L_P$ is primary winding inductance of the transformer; and $F_{sw}$ is the switching frequency of the transformer primary current $I_P$.

It can be observed from Equation [2] and [3], to increase power output $P_{out}$, one can increase the current limit $I_{lim}$ and/or the switching frequency $F_{sw}$. Increasing the current limit $I_{lim}$ too much may lead to the transformer core saturation condition. Increasing only the switching frequency $F_{sw}$ will result in a limited power boost, since the current limit $I_{lim}$ is the dominant term which affects the output power $P_{out}$.

In the embodiment of the invention, the controller 10 uses the feedback voltage $V_{FB}$ to control the duty cycle and the switching frequency of an PWM signal $S_{PWM}$ connect to the switching transistor Q, such that proper output voltage regulation is achieved. In some embodiments, the controller 10 is configured to determine a control voltage Vctl (not shown), which is simply the feedback voltage $V_{FB}$ or positively correlated to the feedback voltage $V_{FB}$, and then utilize the control voltage Vctl or the feedback voltage $V_{FB}$ to determine an operation mode for the flyback SMPS 1. The operation mode includes a normal mode and a high power mode. The controller 10 is configured to generate the duty cycle and a switching frequency of the PWM signal $S_{PWM}$ according to the feedback voltage $V_{FB}$. The PWM signal $S_{PWM}$ is connected to the switching transistor Q, thereby controlling a current limit $I_{lim}$ and a switching frequency $F_{sw}$ of the input current $I_P$ at the primary circuit and providing regulated output voltage $V_{out}$ at the secondary circuit.

Figure 3:
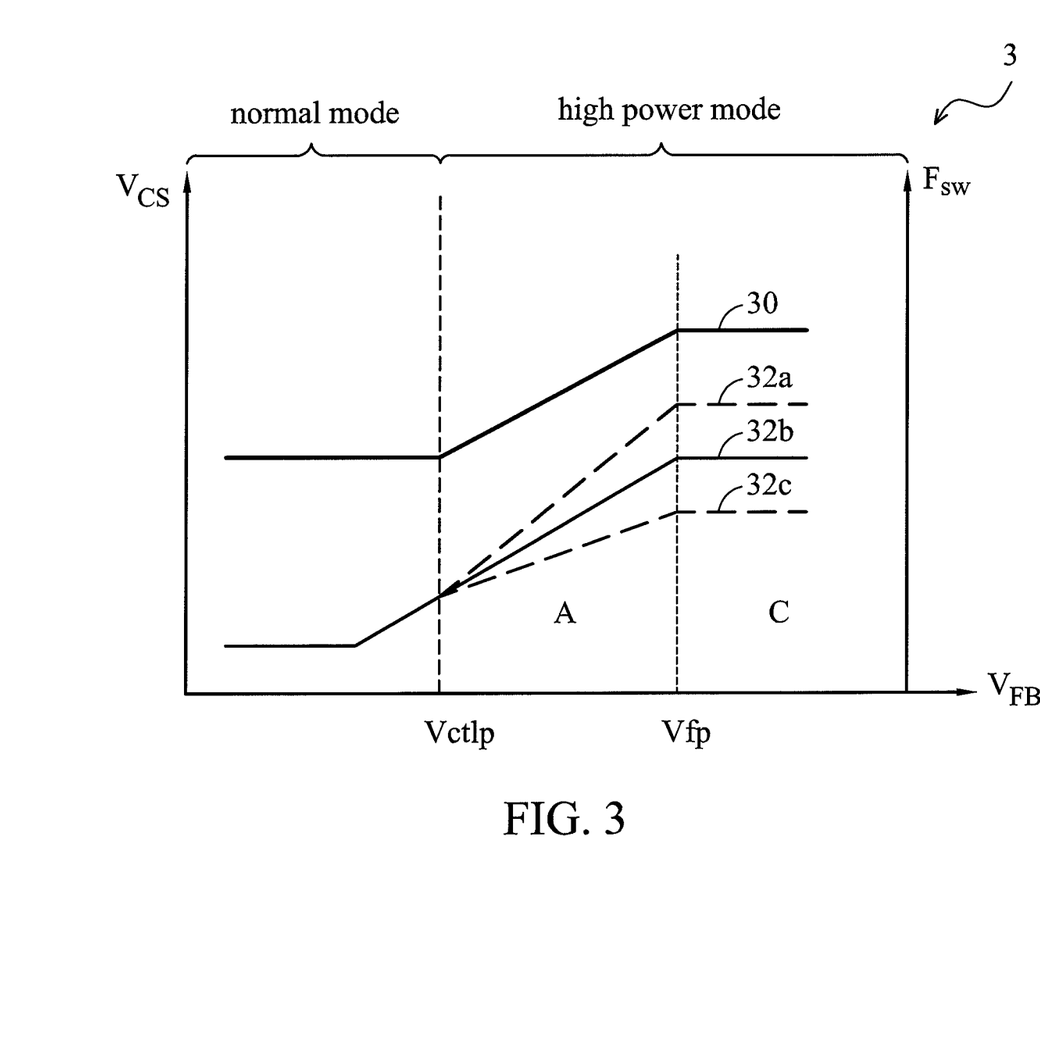
FIG. 3 is a line diagram which shows lines 30 and 32a, b, c representing another control scheme 3 of the Vcs and the switching frequency of the primary current $I_P$ with respect to the feedback voltage $V_{FB}$ of the flyback converter 1 according to another embodiment of the invention.

In some embodiments, the flyback SMPS 1 is configured to increase a current limit $I_{lim}$ at an adaptable rate, preventing the switching transistor Q from being blown out under excessive current stress, as depicted in FIG. 3.

Figure 4:
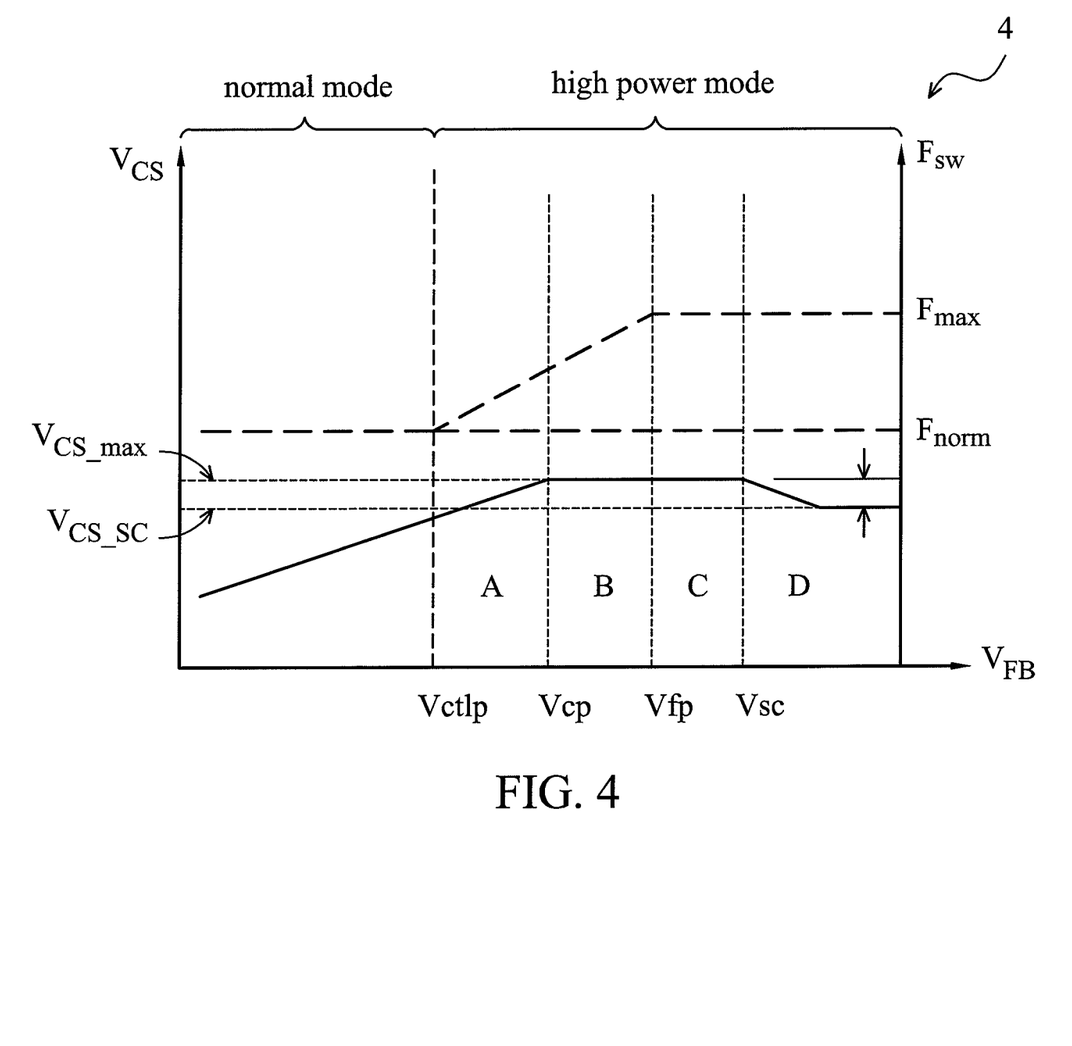
FIG. 4 is a line diagram which shows another control scheme 4 of the Vcs and the switching frequency of the primary current $I_P$ with respect to the feedback voltage $V_{FB}$ of the flyback converter 1 according to yet another embodiment of the invention.

In other embodiments, the flyback SMPS 1 is configured to further limit the current limit $I_{lim}$ of the primary current $I_P$ in short-circuit conditions to a short-circuit current Isc, preventing the switching transistor Q from being blown out, as depicted in FIG. 4.

While the embodiments utilize the peak current control mode to illustrate the feature and principle of the invention, applications thereof may extend to an averaged current mode, in which the peak current parameter is replaced with an averaged current parameter.

The flyback SMPS 1 provides increased power delivery at the output by increasing the current limit $I_{lim}$ and/or the switching frequency $F_{sw}$ of the primary input current $I_P$ at the primary circuit.

Figure 2:
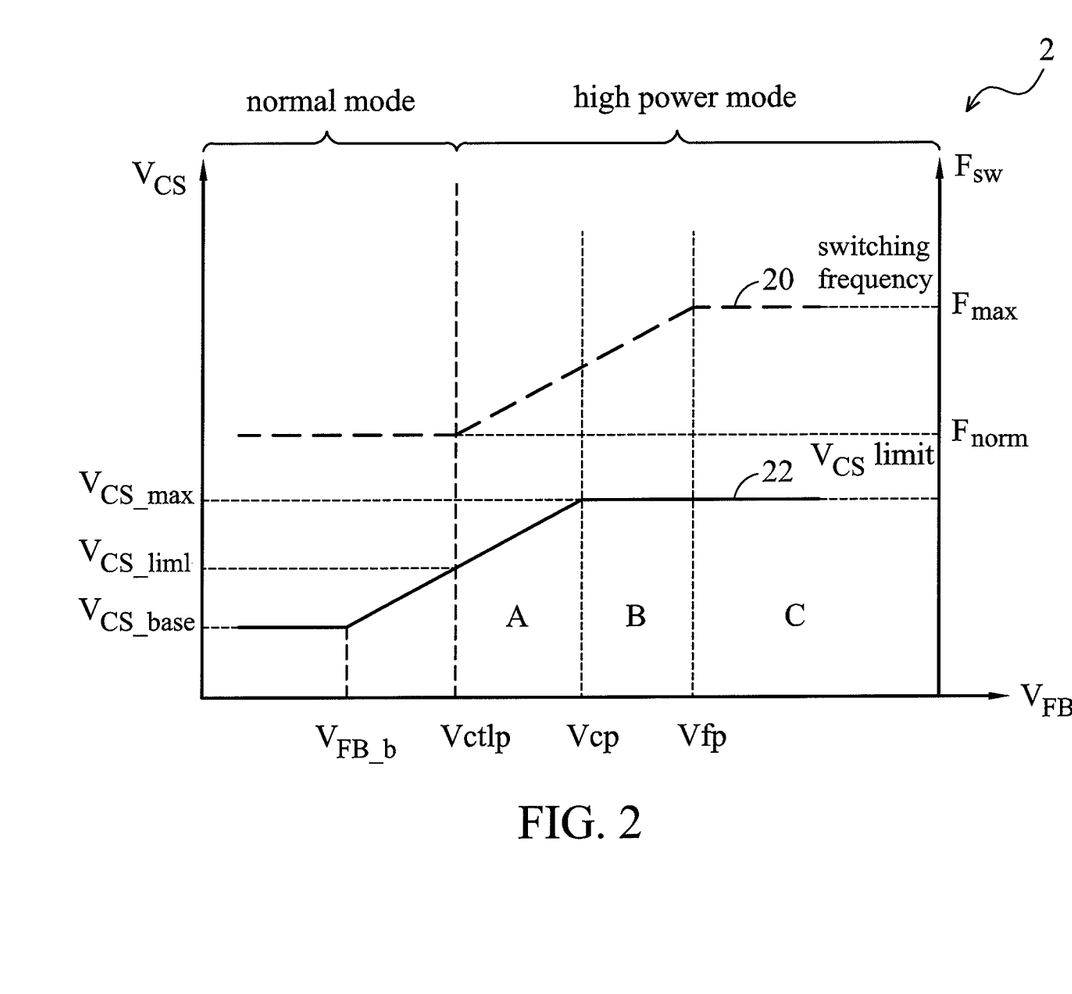
FIG. 2 illustrates a line diagram which shows a control scheme 2 of the Vcs and the switching frequency of the primary current $I_P$ with respect to the feedback voltage $V_{FB}$ according to an embodiment of the invention.

Accordingly, the flyback SMPS 1 can operate in the normal mode and the high power mode. FIG. 2 illustrates a line diagram which shows a control scheme 2 of a Vcs limit curve 22 and a switching frequency curve 20, according to an embodiment of the invention, incorporating the flyback SMPS 1 in FIG. 1. The Vcs limit curve 22 and the switching frequency curve 20 respectively represent a current limit and a switching frequency of the primary current $I_P$ with respect to the feedback voltage $V_{FB}$. In some embodiments, the controller 10 can control the switching transistor Q to impose the Vcs limit and the switching frequency on the primary current $I_P$ according to the feedback voltage $V_{FB}$.

Referring to the Vcs limit curve 22 and the switching frequency curve 20 of FIG. 2, when the feedback voltage $V_{FB}$ is less than a peak power mode voltage Vctlp (first threshold voltage), the flyback SMPS 1 operates in the normal mode, the controller 10 determines the current limit of the primary current $I_P$ according to the feedback voltage $V_{FB}$, while the switching frequency $F_{sw}$ of the primary current $I_P$ remains substantially constant or fixed, independent of the feedback voltage $V_{FB}$. In the normal mode, as the output load increases, the feedback voltage $V_{FB}$ increases, and the flyback SMPS 1 increases the power delivery by increasing only the current limit of the primary current $I_P$.

In particularly, in the normal mode, as shown in left part of the Vcs limit curve 22 and the switching frequency curve 20, respectively, when the feedback voltage $V_{FB}$ has not yet reached a base feedback voltage $V_{FB\_b}$, the current limit of the primary current $I_P$ and the sense voltage limit Vcs_lim can remain at a constant to supply sufficient energy to the output load. When the feedback voltage $V_{FB}$ equals or exceeds the base feedback voltage $V_{FB\_b}$, then the current limit of the primary current $I_P$ and the sense voltage limit Vcs_lim have to be increased to supply sufficient energy to the output load. In the embodiments, when the feedback voltage $V_{FB}$ equals or exceeds the base feedback voltage $V_{FB\_b}$, then the current limit of the primary current $I_P$ and the sense voltage limit Vcs_lim are increased in proportion to the feedback voltage $V_{FB}$ accordingly. The peak power mode voltage Vctlp is determined by the core saturation point of the transformer, such that the transformer will not result in the core saturation condition when the switching frequency $F_{sw}$ remains substantially constant at $F_{norm}$, and the primary current $I_P$ increases up to $I_{lim1}$ (not shown) as a first sense voltage $V_{CS}$ increases to $V_{CS\_lim1}$. Although in the present embodiment, the Vcs limit curve 22 rises from the base feedback voltage $V_{FB\_b}$, in some implementations, the Vcs limit curve 22 does not rise from the base feedback voltage $V_{FB\_b}$, but rather, increases steadily from the origin of the graph in FIG. 2.

When the feedback voltage $V_{FB}$ exceeds a n peak power mode voltage Vctlp, the flyback SMPS 1 operates in the high power mode. In certain circuit applications such as printers, motors, or CPU, a higher current limit is required for a short period of time for boosted power operations. The amount of excess power in the high power mode may be as high as twice or three~four times of the maximum power delivered in the normal mode. In the high power mode, as the output load increases, then the feedback voltage $V_{FB}$ increases, and the flyback SMPS 1 increases the power delivery by increasing the current limit of the primary current $I_P$ and/or the switching frequency $F_{ww}$ of the primary input current $I_P$. Specifically, the current limit of the primary current $I_P$ and the switching frequency $F_{sw}$ can be increased with the feedback voltage $V_{FB}$. The switching frequency $F_{SW}$ is increased to extend the operating range of the input current $I_P$ without causing the core saturation condition. Therefore, by increasing switching frequency $F_{sw}$, the current limit of the primary current $I_P$ can be increased to boost the energy provision without resulting in the core saturation condition. In certain embodiments, the current limit of the primary current $I_P$ can be increased with the feedback voltage $V_{FB}$ at a rate substantially the same as the increasing rate in the normal mode. In other embodiments, the current limit of the primary current $I_P$ can be increased at a rate different from that in the normal mode. Moreover, in some embodiments, the increasing rate of the current limit of the primary current $I_P$ in the high power mode is adaptable by a configuration set to the controller 10, as depicted in FIG. 3.

In some embodiments, the high power mode is further implemented in 3 zones, illustrated by zones A, B and C. The zone A is defined by a range between the peak power mode voltage Vctlp and a voltage of control voltage limit Vcp (second threshold voltage). When the feedback voltage $V_{FB}$ is in the zone A, the current limit of the primary current $I_P$ and the switching frequency $F_{sw}$ are increased in proportion to the feedback voltage $V_{FB}$. The current limit of the primary current $I_P$ and the switching frequency $F_{sw}$ may be increased in the same or different rates. When the current limit of the primary current $I_P$ continues to be increased till the maximal voltage limit $V_{CS\_max}$ is reached, the transformer is close to the core saturation condition despite the increase in the switching frequency $F_{sw}$, thus the flyback SMPS 1 enters the zone B.

The zone B is defined by a range between the voltage of control voltage limit Vcp and a voltage of switching frequency limit Vfp (third threshold voltage). When the feedback voltage $V_{FB}$ is in the zone B, the switching frequency $F_{sw}$ are increased in proportion to the feedback voltage $V_{FB}$ while the current limit of the primary current $I_P$ remains substantially constant as the sense voltage $V_{is}$ remains at the maximal voltage limit $V_{CS\_max}$, independent of the change in the feedback voltage $V_{FB}$. In the zone B, the power delivery is not increased much, because when the switching frequency $F_{sw}$ has approached a relatively large value, the reciprocal of the switching frequency $F_{sw}$ in Equation [3] is an insignificant term. For a transformer having a lower margin to saturation, the core saturation condition is easily resulted in when the feedback voltage $V_{FB}$ approaches the voltage of control voltage limit Vcp, a small increase in the primary current $I_P$ will easily lead to the core saturation of the transformer. Thus, the zone B serves as a buffer region to compensate for the sharp surge of the inductor current when the transformer design is marginal. Referring to Equation [3], when the switching frequency $F_{sw}$ is the only parameter which increases, the reciprocal term of the switching frequency $F_{sw}$ in Equation [3] becomes negligible when the switching frequency $F_{sw}$ increases to a certain level, a further increase in the switching frequency $F_{sw}$ will result in very little increase in the output power $P_{out}$. Thus the flyback SMPS 1 enters the zone C.

The zone C is defined by a range exceeding the voltage of switching frequency limit Vfp. When the feedback voltage $V_{FB}$ is in the zone C, the current limit of the primary current $I_P$ and the switching frequency $F_{sw}$ respectively remain substantially constant at $I_{max}$ (not shown, corresponding to $V_{CS\_max}$) and $F_{max}$, irrespective of the increase of the feedback voltage $V_{FB}$. Since the current limit of the primary current $I_P$ and the switching frequency $F_{sw}$ are both fixed, the output power $P_{out}$ remains substantially the same. If the delivered power is still insufficient for the output load and the transformer attempts to draw additional current, the flyback SMPS 1 will enter a short-circuit mode, or an overload mode, as depicted in FIG. 4. Typically, a timer will keep the controller 10 from operating in the short-circuit mode for too long. A protection mechanism will be triggered to either shut down the flyback SMPS 1 or enable the flyback SMPS 1 to enter an auto-start state.

While the embodiment in FIG. 2 illustrates the flyback SMPS 1 incorporating the zones A, B and C for the high power mode, those skilled in the art would recognize that the flyback SMPS 1 can be adapted to operate with simply the zone A, the zones A and B, or the zones A and C according to the design preference.

The embodiment in FIG. 2 illustrates a flyback SMPS employing the high power mode to acquire increased power delivery.

FIG. 3 is a line diagram which contains Vcs limit curves 32a, b, c representing the Vcs limits which corresponding to the current limits of the primary current $I_P$ in three current limit modes and the switching frequency curve 30 representing the switching frequency of the primary current $I_P$ with respect to the feedback voltage $V_{FB}$, depicting another embodiment of the invention, where the changing rate of the Vcs limit curve 32 is adaptable, preventing the switching transistor Q from being blown out under excessive current stress.

In the normal mode, the Vcs limit curves 32a, b and c are identical and merged into one line, the switching frequency line 30 remains substantially constant with respect to the feedback voltage $V_{FB}$, as discussed in FIG. 2. After the flyback SMPS 1 transitions from the normal mode to the high power mode, the flyback SMPS 1 is configured to select one of the Vcs limit curves 32a, b and c, and adjust the current limit of the primary current $I_P$ according to the selected voltage limit curve. The adaptable changing rate of the current limit of the primary current $I_P$ allows the flyback SMPS 1 to select the smoother Vcs limit curve 32c when the high current may cause the core saturation in the transformer and/or the over-current stress across the switching transistor Q, or select the steeper Vcs limit curve 32a to provide extensive power delivery to the output load, or select the original Vcs limit curve 32b when moderate power delivery is required by the output load, without causing the core saturation in the transformer and the current breakthrough across the switching transistor Q.

In some implementations, the controller 10 of the flyback SMPS 1 can switch the Vcs limit curve at any time according to a predefined selection scheme implemented by hardware circuit or embedded codes in the controller 10. For example, the predefined selection scheme may include that, when the required power delivery exceeds a high power delivery threshold, switch the selected Vcs limit curve to the steeper Vcs limit curve 32a; when the current limit approaches to the saturation current of the transformer, switch the selected Vcs limit curve to the smoother Vcs limit curve 32c, when first entering the high power mode, use the original Vcs limit curve 32b as the default Vcs limit curve. In other implementations, the controller 10 can select the Vcs limit curve upon entering the high power mode.

The different changing rates 32a through 32c may be implemented by parallel connected current sources, with an increasing number of the parallel connected current sources to provide for the changing rates 32a through 32c.

Although the embodiment only shows the zone A and zone C in the high power mode, those skilled in the art should recognize that other combination of the zones A, B and C may be incorporated in the high power mode in FIG. 3.

The embodiment in FIG. 3 depicts the flyback SMPS incorporating an adaptive changing rate of the current limit for the primary current $I_P$ in the high power mode, offering flexible and controllable power delivery.

FIG. 4 is a line diagram which shows another control scheme 4 of the current limit of the primary current $I_P$ and the switching frequency $F_{sw}$ with respect to the feedback voltage $V_{FB}$ according to yet another embodiment of the invention.

The control scheme 4 is different from the control schemes 2 and 3 in that a short-circuit protection is implemented into the design. When the output load draws an extraordinary amount of the output power from the flyback SMPS 1, the large current may saturate the transformer, damage the switching transistor Q, or other internal circuit component in the flyback SMPS 1. T As a consequence, the flyback SMPS 1 is designed to be protected from drawing the excessive current in the short-circuit condition. When the feedback voltage $V_{FB}$ exceeds or equals to a short-circuit voltage $V_{SC}$, the short-circuit condition is identified.

To prevent the flyback SMPS 1 from being burnt out by the short-circuit condition, the controller 10 may include a timer circuit (not shown) to limit the duration of time which the system falls into the short-circuit condition. When the timer reaches its set point, the controller 10 enters a protection zone D which adjusts the PWM output $S_{PWM}$ and the current limit of the primary current $I_P$ to a short-circuit current protection level which corresponds to a voltage limit $V_{CS\_SC}$. In some implementations, the controller 10 is configured to gradually lower the current limit of the primary current $I_P$ to a short-circuit current limit which corresponds to a short-circuit voltage limit $V_{CS\_SC}$. In other implementations, the controller 10 is configured to directly reduce the current limit of the primary current $I_P$ to a short-circuit current limit which corresponds to a short-circuit voltage limit $V_{CS\_SC}$ by a step function, without the intermediate decreasing buffer region (not shown). In some implementations, the controller 10 is configured to trigger a re-start mechanism when the short-circuit condition is not removed. If the short-circuit condition continues, the flyback SMPS 1 will be shut down and re-started again repeatedly until the short-circuit condition is removed.

The embodiment in FIG. 4 depicts the flyback SMPS incorporating a short-circuit protection, preventing from the irreversible damage to the flyback SMPS under the short-circuit condition.

Figure 5:
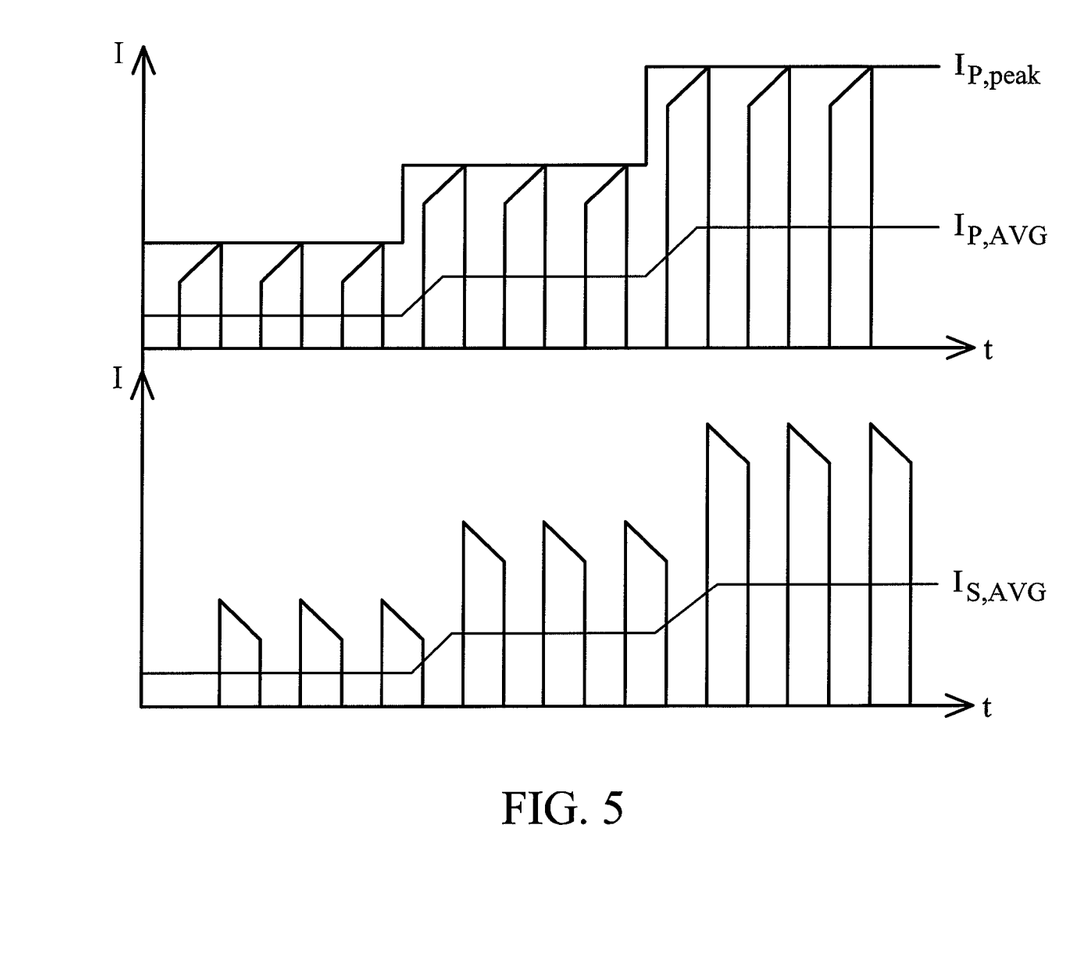
FIG. 5 illustrates the relationship of the primary current $I_P$ and the secondary current $I_S$ on the time domain as the output load increases according to an embodiment of the invention.

FIG. 5 illustrates the relationship of the primary current $I_P$ and the secondary current $I_S$ of the transformer on the time domain as the output load increases according to an embodiment of the invention.

The embodiments in FIGS. 1 through 4 show the flyback SMPS 1 providing the high power mode which supports extensive power delivery by increasing the switching frequency $F_{sw}$ along with the current limit of the primary current $I_P$ of the transformer primary current $I_P$, as the feedback voltage $V_{FB}$ exceeds the peak power mode voltage Vctlp. The current waveforms in FIG. 5 show the behaviors of the input primary current $I_P$ (top half) and the output secondary current $I_S$ (bottom half) as the output load increases. As the output load increases, the peak current waveforms current $I_{p,peak}$ and the average current waveforms current $I_{p,AVG}$ are increased accordingly, transformer secondary averaged output current $T_{S,AVG}$ is increased as well, resulting in the increase in the output power delivery at the secondary circuit.

Figure 6:
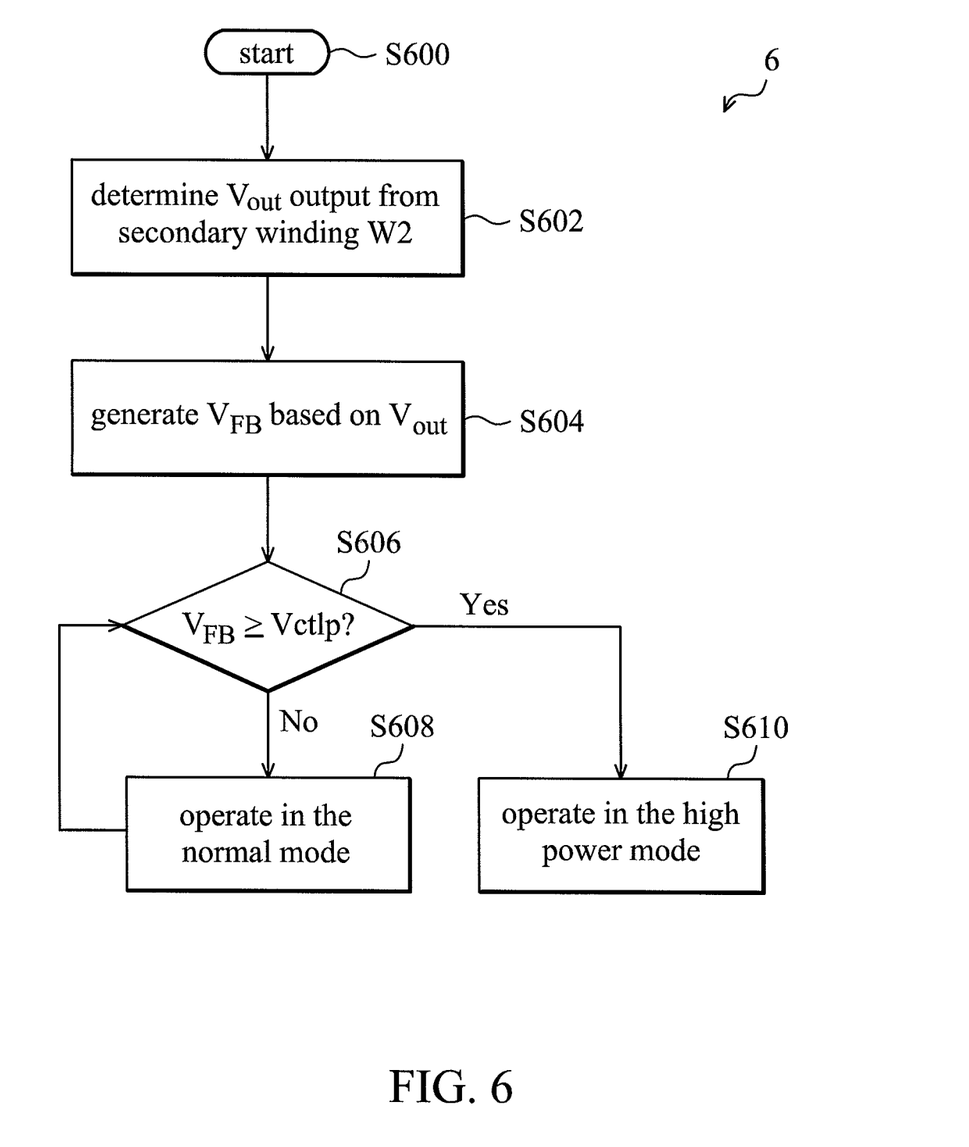
FIG. 6 is a flowchart of a control method 6 according to an embodiment of the invention.

FIG. 6 is a flowchart of a control method 6 according to an embodiment of the invention, incorporation the flyback SMPS 1 in FIG. 1 and the control schemes 2, 3 or 4 depicted in FIGS. 2 through 4.

Upon startup, the flyback SMPS 1 is powered on and operates in the normal mode, where the current limit $I_{lim}$ of the primary current $I_P$ increases with the feedback voltage $V_{FB}$, while the switching frequency $F_{sw}$ of the primary current $I_P$ remains constant irrespective of the feedback voltage $V_{FB}$ (S600), thereby providing the output voltage $V_{out}$ through the secondary winding W2 to the secondary circuit when the switching transistor Q is turned off. The resistor network at the secondary circuit then determines the output voltage $V_{out}$ (S602) to provide the feedback voltage $V_{FB}$ through the optic couplers $D_{OPTO1}$ and $D_{OPTO2}$ to the controller 10 (S604). The feedback voltage $V_{FB}$ is generated by firstly dividing the output voltage $V_{out}$ by a voltage divider circuit to acquire the divided voltage $V_{div}$, feeding the divided voltage $V_{div}$ to the shunt regulator T1 to produces a shunt regulator generated current which is in proportion to the difference of the divided voltage $V_{div}$ and the internal reference voltage, converting the shunt regulator generated current proportionally to the feedback voltage $V_{FB}$ through the optic couplers $D_{OPTO1}$ and $D_{OPTO2}$, and providing the feedback voltage $V_{FB}$ to the controller 10 for controlling the current limit and the switching frequency of the PWM signal $S_{PWM}$. Upon receiving the feedback voltage $V_{FB}$, the controller 10 compares the feedback voltage $V_{FB}$ and the peak power mode voltage Vctlp and determines whether the feedback voltage $V_{FB}$ exceeds or equals to the peak power mode voltage Vctlp (S606). When it does, the output load demands a power delivery exceeding the power supply capacity supported by the normal mode, thus the controller 10 switches the operation mode of the flyback SMPS 1 from the normal mode to the high power mode (S610). In the high power mode, both the current limit $I_{lim}$ and the switching frequency $F_{sw}$ of the primary current $I_P$ increases with the feedback voltage $V_{FB}$, thereby flux density of transformer is lower, the maximum allowed transformer primary current can be increased, subsequently the current limit can be raised accordingly without causing the core saturation condition and supply more power to the output load. The method adopted in the high power mode is detailed in control methods 7 through 9 in FIGS. 7 through 9. When the feedback voltage $V_{FB}$ is less than the peak power mode voltage Vctlp, the normal mode is able to handle the power requirement demanded by the output load, then the controller 10 remains to operate in the normal mode (S608).

The control method 6 allows the flyback SMPS 1 to operate in the normal mode and the high power mode, increasing power delivery to the output load in the high power mode by concurrently increasing the current limit $I_{lim}$ and the switching frequency $F_{sw}$ of the primary current $I_P$ according with increased feedback voltage $V_{FB}$.

Figure 7:
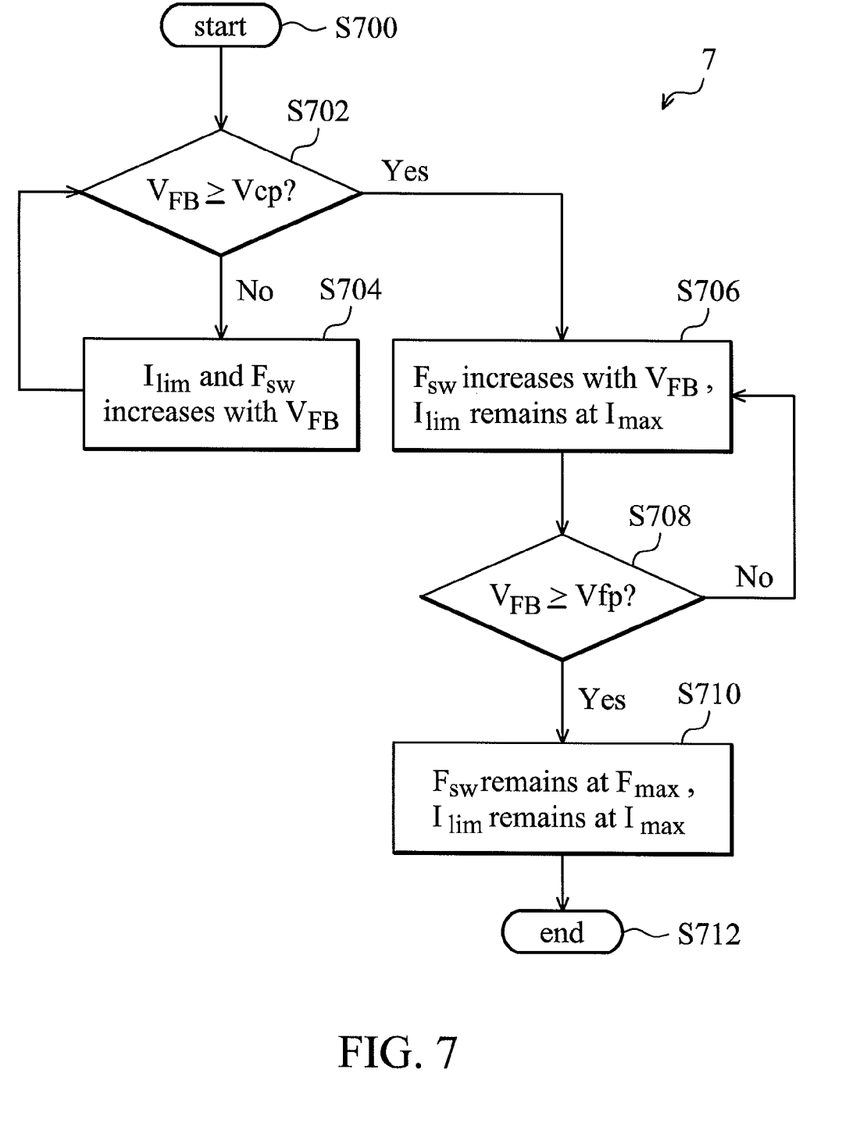
FIG. 7 is a flowchart of a control method 7 in the high power mode according to an embodiment of the invention.

FIG. 7 is a flowchart of a control method 7 in the high power mode according to an embodiment of the invention, incorporating the flyback SMPS 1 in FIG. 1 and the control scheme 2 in FIG. 2.

Upon startup of the control method 7, the flyback SMPS 1 has been switched to the high power mode, therefore the controller 10 controls the PWM signal $S_{PWM}$ to allow the current limit $I_{lim}$ and the switching frequency $F_{sw}$ of the primary current $I_P$ increase with the feedback voltage $V_{FB}$ (S700). Referring to FIG. 2, the high power mode contains the zones A, B and C. The controller 10 determines whether the flyback SMPS 1 should operate in the zone A or zone B to meet the power requirement of the output load by determining whether the feedback voltage $V_{FB}$ exceeds or equals to the voltage of control voltage limit Vcp (S702).

When the feedback voltage $V_{FB}$ is less than the voltage of control voltage limit Vcp, the controller 10 keeps the flyback SMPS 1 remain in the zone A, the current limit $I_{lim}$ and the switching frequency $F_{sw}$ of the primary current $I_P$ increase with the feedback voltage $V_{FB}$ (S704), the controller 10 returns to Step 702 to determine zone A or zone B to go by monitoring voltage of $V_{FB}$ (S704).

If the feedback voltage $V_{FB}$ exceeds or equals to the voltage of control voltage limit Vcp, the controller 10 then keeps the flyback SMPS 1 in the zone B, that is, the current limit $I_{lim}$ approaches to the saturation current of the transformer, consequently the controller 10 increases the switching frequency $F_{sw}$ with the feedback voltage $V_{FB}$ while maintains a substantially constant current limit $I_{lim}$ (S706). In the zone B, the power delivery is not increased much with the increasing switching frequency $F_{sw}$, since the switching frequency $F_{sw}$ has approached a relatively large value, the reciprocal term of the switching frequency $F_{sw}$ in Equation [3] is insignificant, producing little increase in the output power.

While the flyback SMPS 1 is operating in the zone B, the controller 10 will determine whether the flyback SMPS 1 should stay in zone B or enters zone C by Step S708, in which the controller 10 checks whether the feedback voltage $V_{FB}$ exceeds or equals to the voltage of switching frequency limit Vfp.

When the feedback voltage $V_{FB}$ is less than the voltage of switching frequency limit Vfp, the controller 10 keeps the flyback SMPS 1 in the zone B, the control method 7 returns to Step S706, increasing the switching frequency $F_{sw}$ with the feedback voltage $V_{FB}$ and maintain a substantially constant current limit $I_{lim}$.

When the feedback voltage $V_{FB}$ exceeds or equals to the switching frequency limit Vfp, the controller 10 switches the flyback SMPS 1 to the zone B, that is, both the current limit $I_{lim}$ and the switching frequency $F_{sw}$ of the primary current $I_P$ remains substantially constant regardless of the change of the feedback voltage $V_{FB}$ (S710). If the feedback voltage $V_{FB}$ continues increasing, the output power delivery is still insufficient for the output load and the transformer attempts to draw additional current, the flyback SMPS 1 will enter short-circuit mode and is either shut down or re-started before the short circuit condition removed.

After Step S710, the control method 7 is completed and exited (S712). The control method 7 allows the flyback SMPS 1 to operate in the zones A, B and C of the high power mode, increasing output power delivery while preventing the core of the transformer from saturation.

Figure 8:
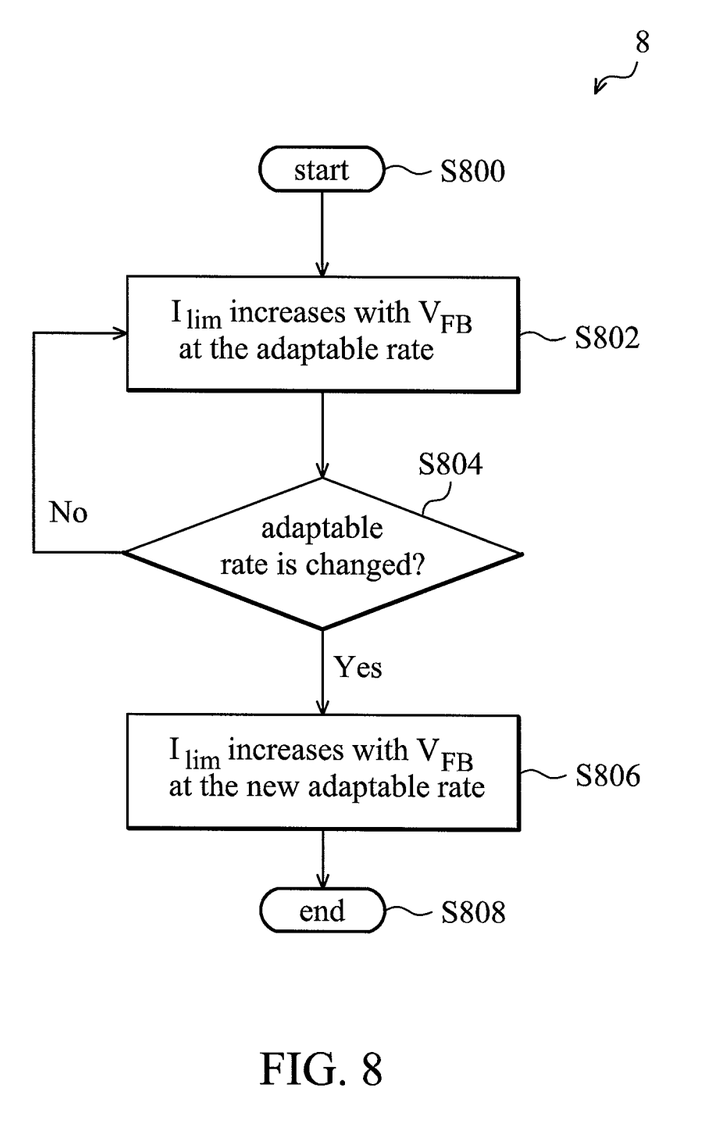
FIG. 8 is a flowchart of a control method 8 according to another embodiment of the invention.

FIG. 8 is a flowchart of a control method 8 according to another embodiment of the invention, incorporating the flyback SMPS 1 in FIG. 1 and the control scheme 3 in FIG. 3.

Upon startup of the control method 8, the flyback SMPS 1 has been switched to the high power mode, therefore the controller 10 controls the PWM signal $S_{PWM}$ to allow the current limit $I_{lim}$ and the switching frequency F, of the primary current $I_P$ increases with the feedback voltage $V_{FB}$ (S800). Referring to FIG. 3, the current limit $I_{lim}$ curve is adaptable by the controller 10 based on the power requirement. The controller 10 can increase the current limit $I_{lim}$ with the feedback voltage $V_{FB}$ at the adaptable rate (S802). Upon firstly entering into the high power mode, the controller 10 may use the Vcs limit curve 32b as a default adaptable rate, and changes the adaptable rate to the smoother Vcs limit curve 32c or the steeper Vcs limit curve 32a based on whether the transformer close to core saturation; the current stress across the switching transistor Q; and power requirement by the output load. In some implementations, the adaptable rate may be changed at any time during the high power mode. The controller 10 continues to check and determine whether the adaptable rate should be changed (S804). If the adaptable rate remains the same, the controller 10 will go back to Step S802 and continue to restrict the current limit $I_{lim}$ of the primary current $I_P$ based on the current adaptable rate. If the adaptable rate is changed, the controller will modify the current limit $I_{lim}$ based on the changed (new) adaptable rate (S806). When the controller 10 detects that the core saturation or the transistor over current stress condition are about to occur, the adaptable rate can be decreased. When the controller 10 detects that surge power requirement is demanded by the output load, the adaptable rate can be increased. When the controller detects the power requirement of the output load can be met by the present changing rate, the controller 10 will maintain the present adaptable rate. After Step S806, the control method 8 is completed and exited (S808).

The control method 8 allows the flyback SMPS 1 to operate by an adaptable rate in the high power mode, delivering surge output power while preventing the transformer from saturation.

Figure 9:
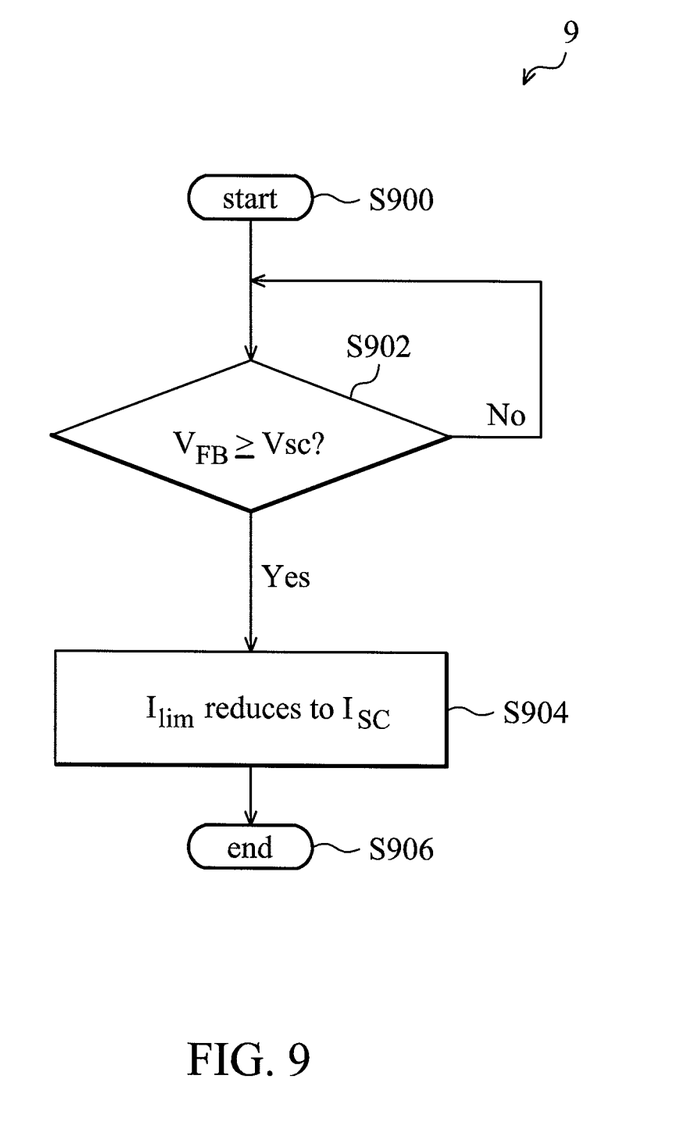
FIG. 9 is a flowchart of a control method 9 according to yet another embodiment of the invention.

FIG. 9 is a flowchart of a control method 9 according to yet another embodiment of the invention, incorporating the flyback SMPS 1 in FIG. 1 and the control scheme 4 in FIG. 4.

Upon startup of the control method 9, the flyback SMPS 1 has been switched to the high power mode (S900). When the output load requires considerable output power which makes the feedback voltage exceed switching frequency limit Vfp, the controller 10 is configured to maintain the switching frequency $F_{sw}$ at the frequency limit $F_{max}$ and the current limit $I_{lim}$ at the current limit $I_{max}$. After the point of the voltage of switching frequency limit Vfp, The controller 10 continues to check whether the feedback voltage $V_{FB}$ exceeds or equals to the short-circuit voltage $V_{SC}$ (S902). When the feedback voltage $V_{FB}$ exceeds or equals to the short-circuit voltage $V_{SC}$, the output load has demanded more output power than the flyback SMPS 1 can provide. Consequently, the controller 10 is configured to reduce the current limit $I_{lim}$ to the short-circuit current $I_{SC}$ which is less than the current limit $I_{max}$. (S904), to prevent from drawing excessive current at the input primary current $I_P$, otherwise will result the unwanted transformer saturation and switching transistor Q over-current stress conditions. The control method 9 is then completed and exited (S906).

The control method 9 provides a short-circuit protection to the flyback SMPS 1, preventing the flyback SMPS 1 from damage due to the over-loading condition.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general-purpose processor, a digital signal processor (DSP), an application-specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, units, modules, circuits and systems described herein may be implemented by way of, but not limited to, hardware, firmware, software, software in execution, and combinations thereof.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, adopted by a flyback converter circuit including a transformer, comprising:
   determining an output voltage output from a secondary circuit of the transformer;
   feeding a feedback voltage based on the output voltage from the secondary circuit back to a primary circuit of the transformer;
   increasing a current limit and a switching frequency of a primary current with the feedback voltage; and supplying the primary current to the primary winding of the transformer;

when the feedback voltage exceeds a third threshold voltage, maintaining both the current limit and the switching frequency to be substantially constant; and when the feedback voltage exceeds a fourth threshold voltage, reducing the current limit to a constant overload current, wherein the fourth threshold voltage exceeds the third threshold voltage, and the constant overload current is less than the substantially constant current limit.

2. The method of claim 1, further comprising:

when the feedback voltage is less than a first threshold voltage, maintaining the switching frequency to be substantially constant while increasing the current limit with the feedback voltage.

3. The method of claim 2, wherein the increasing step comprises:

when the feedback voltage exceeds the first threshold voltage, increasing the current limit and the switching frequency of the primary current with the feedback voltage.

4. The method of claim 2, further comprising:

when the feedback voltage exceeds a second threshold voltage, maintaining the current limit to be substantially constant while increasing the switching frequency with the feedback voltage;

wherein the second threshold voltage exceeds the first threshold voltage the third threshold voltage exceeds the second threshold voltage.

5. The method of claim 2, wherein the increasing step comprises:

when the feedback voltage exceeds the first threshold voltage, increasing the current limit at a rate substantially same as that of the increased current limit when the determined feedback voltage is less than a first threshold voltage.

6. The method of claim 2, wherein the increasing step comprises:

when the determined feedback voltage exceeds the first threshold voltage, increasing the current limit at an adaptable rate.

7. A method, adopted by a flyback converter circuit including a transformer, comprising:

determining an output voltage output from a secondary circuit of the transformer;

feeding a feedback voltage based on the output voltage from the secondary circuit back to a primary circuit of the transformer;

increasing a switching frequency of a primary current with the feedback voltage by a first fixed rate;

increasing a current limit of the primary current with the feedback voltage by an adaptable rate;

supplying the primary current to a primary winding of the transformer;

wherein the adaptable rate is changed dynamically;

when the feedback voltage exceeds a third threshold voltage, maintaining both the current limit and the switching frequency to be substantially constant; and when the feedback voltage exceeds a fourth threshold voltage, reducing the current limit to a constant overload current, wherein the fourth threshold voltage exceeds the third threshold voltage, and the constant overload current is less than the substantially constant current limit.

8. The method of claim 7, further comprising:

when the feedback voltage is less than a first threshold voltage, maintaining the switching frequency to be substantially constant while increasing the current limit with the feedback voltage by a second fixed rate; and wherein the increasing step comprises when the feedback voltage exceeds the first threshold voltage, increasing the current limit of the primary current with the feedback voltage by the adaptable rate.

9. The method of claim 8, further comprising: adjusting the adaptable rate to be less than the second fixed rate.

10. The method of claim 8, further comprising: adjusting the adaptable rate to be exceeding the second fixed rate.

11. The method of claim 10, further comprising:

when the feedback voltage is less than a first threshold voltage, maintaining the switching frequency to be substantially constant while increasing the current limit with the feedback voltage by a fixed rate;

wherein the increasing step comprises when the feedback voltage exceeds the first threshold voltage, increasing the current limit and the switching frequency of a primary current with the feedback voltage by the adaptable rate; and the first threshold voltage is less than the short-circuit threshold voltage.

12. The method of claim 10, wherein the increasing step comprises:

when the feedback voltage exceeds the first threshold voltage, increasing the current limit at a rate substantially same as that of the increased current limit when the feedback voltage is less than a first threshold voltage;

wherein the first threshold voltage is less than the short-circuit threshold voltage.

13. The method of claim 8, further comprising: adjusting the adaptable rate to be substantially same as the second fixed rate.

14. A method, adopted by a flyback converter circuit including a transformer, comprising:

determining an output voltage output from a secondary circuit of the transformer;

feeding a feedback voltage based on the output voltage from the secondary circuit back to a primary circuit of the transformer;

increasing a current limit and a switching frequency of a primary current with the feedback voltage;

supplying the primary current to the primary winding of the transformer; and when the feedback voltage exceeds a short-circuit threshold voltage, reducing the current limit to a substantially constant overload current;

wherein the substantially constant overload current is less than a maximal current limit of the primary current;

when the feedback voltage exceeds the first threshold voltage, increasing the current limit at an adaptable rate;

wherein the adaptable rate is changed dynamically;

when the feedback voltage exceeds a third threshold voltage, maintaining both the current limit and the switching frequency to be substantially constant; and when the feedback voltage exceeds a fourth threshold voltage, reducing the current limit to a constant overload current, wherein the fourth threshold voltage exceeds the third threshold voltage, and the constant overload current is less than the substantially constant current limit.

* * * * *